United States Patent
Kuenzner

(10) Patent No.: US 11,492,007 B2
(45) Date of Patent: Nov. 8, 2022

(54) ACTIVATION AND DEACTIVATION OF A DRIVING FUNCTION FOR AUTOMATED DRIVING WITH LONGITUDINAL AND TRANSVERSE GUIDANCE

(71) Applicant: Bayerische Motoren Werke Aktiengesellschaft, Munich (DE)

(72) Inventor: Hermann Kuenzner, Freising (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 105 days.

(21) Appl. No.: 17/049,360

(22) PCT Filed: Apr. 18, 2019

(86) PCT No.: PCT/DE2019/100363
§ 371 (c)(1),
(2) Date: Oct. 21, 2020

(87) PCT Pub. No.: WO2019/206375
PCT Pub. Date: Oct. 31, 2019

(65) Prior Publication Data
US 2021/0237762 A1    Aug. 5, 2021

(30) Foreign Application Priority Data

Apr. 25, 2018   (DE) .................... 10 2018 206 423.7

(51) Int. Cl.
*B60W 60/00*      (2020.01)
*B60W 30/14*      (2006.01)
*B60W 50/08*      (2020.01)

(52) U.S. Cl.
CPC ........ *B60W 60/001* (2020.02); *B60W 30/143* (2013.01); *B60W 50/085* (2013.01); *B60W 2720/10* (2013.01)

(58) Field of Classification Search
CPC ............ B60W 60/001; B60W 30/143; B60W 50/085; B60W 2720/10
See application file for complete search history.

(56) References Cited

U.S. PATENT DOCUMENTS

2002/0133285  A1*  9/2002  Hirasago ................ B60K 35/00
                                                            701/96
2015/0006013  A1   1/2015  Wimmer et al.
(Continued)

FOREIGN PATENT DOCUMENTS

DE    10 2012 002 304  A1    8/2013
DE    10 2015 120 831  A1    6/2016
(Continued)

OTHER PUBLICATIONS

International Search Report (PCT/ISA/210) issued in PCT Application No. PCT/DE2019/100363 dated Aug. 9, 2019 with English translation (five pages).
(Continued)

*Primary Examiner* — Nicholas Kiswanto
*Assistant Examiner* — Mohamad O El Sayah
(74) *Attorney, Agent, or Firm* — Crowell & Moring LLP

(57) ABSTRACT

A driving system for a motor vehicle includes a first driving function for automated driving with automated longitudinal and transverse guidance and a second driving function for automated driving with at least automated longitudinal guidance or with at least automated transverse guidance. The second driving function has a lower level of automation. The first driving function is available for activation in a first admissibility range defined by a lower and/or upper limit for a driving parameter. The driver uses a first input component to prescribe a driver nominal value preset for the driving parameter that is in the first admissibility range. In response, the current driving behavior of the active second driving function is adapted. The driving system then establishes that (Continued)

the driving parameter satisfies a first criterion for the first admissibility range. The first driving function is then activated.

17 Claims, 12 Drawing Sheets

(56) References Cited

U.S. PATENT DOCUMENTS

| | | | |
|---|---|---|---|
| 2016/0129908 A1* | 5/2016 | Harda | B60W 30/146 |
| | | | 701/24 |
| 2016/0252903 A1 | 9/2016 | Prokhorov | |
| 2018/0120839 A1* | 5/2018 | Hasberg | B60W 50/08 |
| 2018/0239352 A1* | 8/2018 | Wang | B60W 60/0053 |
| 2018/0373244 A1 | 12/2018 | Augst et al. | |
| 2019/0047591 A1 | 2/2019 | Augst | |
| 2020/0062278 A1 | 2/2020 | Kuenzner | |
| 2021/0146943 A1* | 5/2021 | Oniwa | B60W 50/085 |

FOREIGN PATENT DOCUMENTS

| | | |
|---|---|---|
| DE | 10 2015 209 137 A1 | 11/2016 |
| DE | 10 2016 200 897 A1 | 7/2017 |
| DE | 10 2016 203 398 A1 | 9/2017 |
| DE | 10 2017 208 506 A1 | 11/2018 |

OTHER PUBLICATIONS

German-language Written Opinion (PCT/ISA/237) issued in PCT Application No. PCT/DE2019/100363 dated Aug. 9, 2019 (six pages).

German-language Search Report issued in German Application No. 10 2018 206 423.7 dated Oct. 30, 2019 with partial English translation (11 pages).

"Forschung kompakt", German Federal Highway Research Institute (BASt), 2012, issued Nov. 2012, with English abstract (two pages).

* cited by examiner

ACTIVATION AND DEACTIVATION OF A DRIVING FUNCTION FOR AUTOMATED DRIVING WITH LONGITUDINAL AND TRANSVERSE GUIDANCE

BACKGROUND AND SUMMARY OF THE INVENTION

The present subject matter relates to a driving system that supports a first driving function for automated driving with automated longitudinal and transverse guidance. The present subject matter furthermore relates to methods for activating or for deactivating the first driving function.

The term "automated driving" in the context of the present subject matter may be understood to mean driving with automated longitudinal or transverse guidance or autonomous driving with automated longitudinal and transverse guidance. Automated driving involves for example, driving on the freeway. The term "automated driving" comprises automated driving with any degree of automation. Example degrees of automation are assisted, partly automated, highly automated or fully automated driving. These degrees of automation have been defined by the German Federal Highway Research Institute (BASt) (see BASt publication "Forschung kompakt" [Compact research], issued November 2012). In the case of assisted driving, the driver continuously performs longitudinal or transverse guidance while the system takes over the respective other function within certain limits. This includes, for example, adaptive cruise control (ACC). In the case of partly automated driving (TAF), the system takes over the longitudinal and transverse guidance for a certain duration and/or in specific situations, wherein the driver must continuously monitor the system as in the case of assisted driving. In the case of highly automated driving (HAF), the system takes over the longitudinal and transverse guidance for a certain duration without the driver having to continuously monitor the system; the driver must however be capable of taking over vehicle guidance within a certain time of taking over vehicle guidance. In the case of fully automated driving (VAF), the system can automatically manage driving in all situations for a specific application case; a driver is then no longer required for this application case. The four degrees of automation mentioned above correspond to SAE Levels 1 to 4 of the SAE J3016 standard (SAE—Society of Automotive Engineering). By way of example, highly automated driving (HAF) corresponds to Level 3 of the SAE J3016 standard. SAE J3016 furthermore also provides SAE Level 5 as the highest degree of automation, this not being contained in the definition of the BASt. SAE Level 5 corresponds to driverless driving, in which the system can automatically manage all situations in the same way as a human driver throughout the entire journey; a driver is then generally no longer required.

In a driving system with a driving function for highly automated driving (HAF), the driving function for highly automated driving is generally not available for activation at all times. The availability is rather linked to a certain condition being met for one or more driving parameters; by way of example, there may be a requirement for
- the driving speed to be in a certain speed range for the activation of HAF,
- the distance from the vehicle in front to be greater than or equal to a specific lower distance limit value, and/or
- the transverse position of the vehicle in the traffic lane to be in a range such that the transverse position is reasonably central.

The activation of highly automated driving is normally limited to a specific speed range for the current driving speed. This is due for example, to technical restrictions (for example, a limit of up to 60 km/h in the case of an HAF driving function for the essential application case of congestion or a limit of up to 130 km/h in the case of a freeway autopilot) or legal speed limits (for example, a permitted maximum speed on a specific road section) or environmental restrictions such as poor vision. The activation of driving functions for assisted or partly automated driving is often also limited to a specific speed range for the current vehicle speed, for example, ACC may not be activated at a vehicle speed greater than 210 km/h.

The driver is possibly not aware of the speed limits for such driving functions. If for example, the driver attempts to activate a driving function for highly automated driving by way of a corresponding control operation (for example, actuating a button in the vehicle cockpit) at a relatively high speed greater than an upper speed limit, the driver receives for example, feedback via a screen in the vehicle cockpit that he is only able to do this at a lower speed. After the driver has reduced the vehicle speed, the driver again must attempt to activate the HAF driving function through a control operation. If the driving speed has not been reduced to a sufficient extent, the driving speed possibly has to be further reduced until the driving speed is finally low enough for the HAF function to be able to be activated by the driver. This results in one or more unnecessary, unsuccessful control operations on the part of the driver to activate the HAF function, wherein the failed attempts may cause the driver to become frustrated.

Such unsuccessful control operations may also arise if another driving parameter relevant to the activation, for example, the distance from the vehicle in front, is outside a permissibility range for activating the driving function.

The object of the present subject matter is therefore firstly to specify a control concept for a driving system in which driver comfort is improved when activating a driving function for automated driving; this control concept could secondly also be transferred to convenient deactivation of the driving function for automated driving.

The object is achieved by the features of the independent patent claims. Advantageous embodiments are described in the dependent claims. It is pointed out that additional features of a patent claim dependent on an independent patent claim, without the features of the independent patent claim or only in combination with a subset of the features of the independent patent claim, may form a separate invention independent of the combination of all of the features of the independent patent claim, that may be made into the subject matter of an independent claim, a divisional application or a subsequent application. This applies analogously to the technical teaching described in the description, which teaching may form an invention independent of the features of the independent patent claims.

The present subject matter relates to a driving system for a motor vehicle with a first driving function (for example, SAE Level 3=HAF or higher) for automated driving with automated longitudinal and transverse guidance and a second driving function for automated driving with at least automated longitudinal guidance (for example, ACC or TAF) or with at least automated transverse guidance (for example, lane keep assistant or TAF). The second driving function has a lower degree of automation than the first driving function. The first driving function is preferably an HAF freeway autopilot. The first driving function is available for activation in a first permissibility range for a driving parameter, defined by a lower and/or upper limit, for example, when the driving speed is in a speed range from 60 km/h to 130 km/h. The driving function is preferably able to be activated solely in this permissibility range. The activation of the first driving function may of course also be linked to whether a driving parameter (for example, the distance from the vehicle in front in terms of time or length) other than the abovementioned driving parameter (for example, the vehicle speed) is in a corresponding permissibility range (for example, less than 3 seconds).

The permissibility range may have an upper and a lower limit or have just a lower or just an upper limit. The upper and/or lower limit may in this case be part of the permissibility range (for example, a speed range of less than or equal to 130 km/h) or specifically no longer be part of the permissibility range (for example, a speed range of less than 130 km/h).

The driving system has a user interface with at least one first input component by way of which the driver can specify a setpoint specification for the driving parameter, for example, a set speed (setpoint speed) for the speed controller. This involves for example, one or more (preferably manually actuable) control elements, for example, physical buttons or a rocker, or one or more virtual control elements, for example, buttons, on a touch-sensitive screen. The input component may instead also be an input component able to be controlled by voice or by gestures.

In the case of the vehicle speed as driving parameter, this involves for example, a control increment input, able to be actuated manually or to be controlled by voice or by gestures, for (in particular incrementally) increasing and reducing the set speed, that for example, incrementally increase or reduce the set speed by a specific value (for example, 10 km/h) upon each individual control input and/or upon continuous actuation. In the case of the vehicle speed as driving parameter, the first input component may be a control setting input, a manually actuable control element, for adopting the (legally) permitted maximum speed on the road section.

The first input component may be used to input the setpoint specification for the driving parameter at least for the second driving function; for example, the set speed may be specified for a TAF or ACC driving function. A setpoint specification for the driving parameter may preferably also be input for the first driving function, for example, an HAF driving function; for example, a set speed may also be specified for the HAF driving function, and the speed controller for the HAF driving function adjusts the speed to this set speed. A set speed that is set in this case preferably applies both to the first and to the second driving function.

The driving system is configured to perform various activities that are described below. This typically takes place by way of an electronic control unit, which may also be distributed over a plurality of controllers. The electronic control unit may comprise one or more computers having one or more processors coupled to memory that operates in the manner according to the present subject matter by executing software instructions stored in the memory.

Starting from a driving state with an active second driving function (for example, active TAF driving function or active ACC driving function) and a value of the driving parameter outside the first permissibility range (for example, a current vehicle speed greater than the maximum permitted vehicle speed for activating an HAF driving function), the driver uses the first input component to specify a setpoint specification from the driver for the driving parameter that is in the first permissibility range, for example, a set speed of 120 km/h in the case of a maximum permitted vehicle speed of 130 km/h for activating the HAF driving function. The current driving behavior of the active second driving function is adapted (for example, the vehicle speed is reduced or the distance from the vehicle in front is increased) in response to the setpoint specification. In the context of adapting the driving behavior, when the second driving function is active, the value of the driving parameter is changed, in particular adjusted, in the direction of the setpoint specification by way of automated longitudinal guidance (for example, in the case of a set speed or of a specification with respect to the distance from the vehicle in front) or by way of automated transverse guidance (for example, in the case of specification of the transverse position in the traffic lane). A speed controller for the second driving function attempts for example, to reduce or to increase the vehicle speed to the set speed (depending on the starting speed).

The driving system then establishes at some point that the driving parameter (for example, the vehicle speed or the distance from the vehicle in front) meets a first criterion with respect to the first permissibility range. The first criterion requires for example, the driving parameter to be in the first permissibility range. It would in theory also be conceivable for the first criterion to be met even before the first permissibility range is reached (for example, starting from 5 km/h below the upper speed limit of the permissibility range). The first criterion will however preferably be met only when the driving parameter is in the first permissibility range.

The first driving function (for example, HAF) is activated by the system after the driving parameter meets the first criterion with respect to the first permissibility range, for example, after the driving parameter reaches the first permissibility range, in response to the first permissibility range being reached. The activation of the first driving function may take place under the proviso that one or more other driving parameters (for example, the temporal distance from the vehicle in front, the transverse position in the traffic lane) meet a respective criterion with respect to the respective permissibility range, for example, the temporal distance from the vehicle in front is large enough and/or the transverse position in the traffic lane is sufficiently central. The one or more other driving parameters may for example, be adapted automatically via the second driving function. The first driving function is preferably activated by the system as soon as all of the driving parameters that are relevant to the activation of the first driving function meet the respective criterion.

It is advantageous if no further control operation from the driver is necessary in order to activate the first driving function after the setpoint specification for the driving parameter has been input; it would however be conceivable for the driver to have to confirm the activation of the first driving function through a control operation before said first driving function is activated, for example, by actuating a control element or by letting go of a steering wheel (which preferably comprises a hands-on sensor system).

The concept according to the present subject matter offers the advantage that ambiguous non-activation of the first driving function through an activation attempt from the driver at the time of a value of the driving parameter that is unsuitable for the activation (for example, an excessively high vehicle speed) is avoided, since the second driving function puts the driving parameter into the first permissibility range in accordance with the setpoint specification, such that the first driving function is activated.

The driver is thus able to activate the first driving mode in a convenient manner via the setpoint specification for the driving parameter, for example, by setting the set speed.

In the case of a substantially seamless transition from the second driving function (for example, TAF) to the first driving function (for example, HAF) upon reaching the first permissibility range (for example, reaching the limit speed for HAF), the vehicle may also prepare to take over responsibility in an optimum manner (for example, setting the correct distance from the vehicle in front, possibly also from the vehicle behind, correct alignment in the transverse direction in the traffic lane). Unnecessary control operations and frustration caused by failed attempts are dispensed with.

It is advantageous if the user interface furthermore has a second input component for the driver to signal the driver's desire for automated driving.

This may be an input component that is used for the driver to signal the driver's desire to activate the first driving function; for example, an actuable control element (a control button) for activating the first driving function.

It is however advantageous if the second input component is not an input component designed just to activate the first driving function, but rather a joint input component for a plurality of driving functions, a joint control element (for example, a button). The plurality of driving functions comprises the first driving function (for example, HAF) and the second driving function (for example, TAF), and provision is preferably furthermore made for one or more further driving functions (for example, ACC and/or a lane keep assistant without longitudinal guidance). In the case of a joint input component for a plurality of driving functions, a control operation via the input component signals to the system the driver's general desire for automated driving, without a direct reference to the first driving function. The driving system is then configured, after establishing the desire, signaled via the second input component, for automated driving, to activate that available driving function from the plurality of driving functions that has the highest possible degree of automation. Such a control concept having a joint control element is disclosed in German patent application 102017208506.1 entitled "Fahrsystem mit verschiedenen Fahrfunktionen zum automatisierten Fahren und einem gemeinsamen Bedienelement sowie Verfahren zum Aktivieren einer Fahrfunktion über das gemeinsame Bedienenement" [Driving system with different driving functions for automated driving and a joint control element, and method for activating a driving function using the joint control element], filed on May 19, 2017. This control concept with a joint control element is hereby incorporated into the disclosure content of this application by reference.

The joint input component may also be (instead of an actuable control element) a voice input apparatus by way of which the driver signals to the system the desire for automated driving. The control operation is then a speech input from the driver that generally signals the desire for automated driving, without the voice input being targeted at a specific driving function from the plurality of driving functions. The voice input apparatus receives a voice signal, a voice command, from the driver and evaluates it by way of voice recognition. By way of example, the driver gives the voice command "Drive automatically" or "Please drive automatically". This is interpreted by the voice input apparatus to mean that the driver would like automated driving.

Instead of using a control element or a voice input, input via gestures may be provided to signal the desire for automated driving to the system.

If the driver uses the joint input component to signal the general desire for automated driving to the system in manual driving mode, that available driving function from the plurality of driving functions that has the highest possible degree of automation is activated. By way of example, in a driving state without an active first driving function and without an active second active driving function, after the desire for automated driving is received, the system checks whether the first driving function is available. This involves checking whether the driving parameter is in the first permissibility range (for example, the vehicle speed in the permitted speed range). If the driving parameter is in the first permissibility range, the first driving function is activated. This may take place directly without a further driver input. In order to activate the first driving function, a previous confirmation of the activation from the driver may however be necessary instead, depending on the implementation, for example, by actuating a button following signaling that the first driving function is available.

If the driving parameter is not in the first permissibility range, the second driving function with a lower degree of automation is activated (provided that this is available). This may take place directly without a further driver input. To activate the second driving function, a previous confirmation of the activation may however also be necessary, depending on the implementation, for example, by actuating a button following signaling that the second driving function is available.

Starting from a driving state with an active second driving function, the driver may then specify a setpoint specification for the driving parameter for the system that is in the first permissibility range. As already described above, when the second driving function is active, the value of the driving parameter may then be changed (in particular adjusted) in the direction of the setpoint specification by way of automated longitudinal guidance or by way of automated transverse guidance and the first driving function may then be activated after the driving parameter meets the first criterion with respect to the first permissibility range, in particular after the driving parameter has reached the first permissibility range.

It is assumed below that the driving parameter is the vehicle speed and the setpoint specification for the driving parameter is a set speed (a setpoint vehicle speed). It is advantageous in this case if the driving system is configured to set the set speed to the current vehicle speed when the second driving function is activated. Starting from the driving state with an active second driving function, the driver may then use the speed input component to input a set speed that is changed by the driver and is in the first permissibility range. In the case of an incremental change in the set speed, the driving system may start to change the vehicle speed already during the change in the set speed before the driver has reached a set speed in the first permissibility range by incrementally changing the set speed.

It is advantageous if the user interface comprises a display component that signals to the driver that the set speed specified via the first input component is in the first permissibility range. This means that it is apparent to the driver whether the set speed is in the first permissibility range. This is the case for example, when the first permissibility range is marked accordingly on a speed scale.

The display component is preferably configured to mark the set speed that is respectively set by way of a marker on a speed scale. The speed scale may be the speed scale of the tachometer for displaying the vehicle speed. The marker of the set speed can be displayed in different states, in particular different color states. The marker is displayed in a certain state (for example, in blue) of the plurality of different states when the set speed is in the first permissibility range. This signals to the driver that the specified set speed is then in the first permissibility range.

A description has been given above, in the context of the present subject matter, of the activation of the first driving function by specifying a suitable setpoint specification for the vehicle parameter.

The present subject matter relates to the deactivation of the first driving function by specifying a suitable setpoint specification for a driving parameter. A driving system according to the present subject matter has at least the first driving function described above, but preferably both the first and the second driving function described above. In this case, a setpoint specification for the driving parameter, for example, a set speed, can be input at least for the first driving function by the driver via a first input component. The first input component is preferably also able to be used to specify the setpoint value for the driving parameter for the second driving function. By way of example, a set speed can be specified by the driver for the first and the second driving function.

The driving system is configured to perform various activities that are described below. This typically takes place by way of an electronic control unit, which may also be distributed over a plurality of controllers. The electronic control unit may comprise one or more computers having one or more processors coupled to memory that operates in the manner according to the present subject matter by executing software instructions stored in the memory.

The driving system is configured so as, starting from a state with an active first driving function and a current driving parameter in the first permissibility range, to use the first input component to receive a setpoint specification for the driving parameter that is outside the first permissibility range. By way of example, a set speed that is outside the first permissibility range, above the upper speed limit or below the lower speed limit, is received.

When the first driving function is active, the driving parameter is changed (for example, the vehicle speed is increased), in particular adjusted, in the direction of the setpoint specification for the driving parameter, depending on the driving parameter, for example, via the automated longitudinal guidance or the automated transverse guidance. A speed controller for the first driving function attempts for example, to increase or to reduce the vehicle speed to the set speed (depending on the starting speed).

The driving system then establishes at some point that the driving parameter (for example, vehicle speed) meets a second criterion with respect to the upper or lower limit (for example, reaches or exceeds the upper limit or reaches or exceeds the lower limit).

The first driving function is deactivated after the driving parameter has met a second criterion with respect to the upper or lower limit, in particular after the driving parameter has reached or exceeded the upper limit or reached or fallen below the lower limit.

By setting a suitable setpoint specification for the driving parameter (inputting a suitable set speed), it is possible not only to activate the first driving function, as has been discussed in the context of the present subject matter, but also to deactivate the first driving function.

In the course of deactivating the first driving function, the second driving function is preferably activated such that the first driving function is replaced by the second driving function—at least without a noticeable manual driving mode between them. When the second driving function is active, the driving parameter is then changed to the setpoint specification (already input when the first driving function is active) for the driving parameter, for example, the driving speed is increased to the set speed.

It is advantageous if the driver must acknowledge the deactivation of the first driving function using a suitable input component of the user interface (following a previous request) through a control operation before the first driving function is actually deactivated. By way of example, the driver may grab the steering wheel to acknowledge an HAF driving function (in this case, a hands-on sensor system is preferably integrated in the steering wheel) or actuate a button in another control concept.

At least two possible alternative designs are conceivable for the acknowledgement:

By way of example, in a first alternative, the driving system may ask the driver to acknowledge the deactivation of the first driving function when the driving parameter reaches the respective limit of the first permissibility range in the course of changing the driving parameter, for example, when the driving speed reaches the upper limit of the permitted speed range for the first driving function. The system then preferably remains in the first driving function without a further change in the driving parameter for as long as the driver does not acknowledge the deactivation. When the driver acknowledges the deactivation of the first driving function, the first driving function is deactivated, the second driving function is activated and the first driving function changes the driving parameter to the setpoint value.

In a second alternative, the driver already must acknowledge the deactivation of the first driving function during the change in the setpoint specification (for example, in the event of the setpoint specification exceeding the limit of the permissibility range) or immediately after inputting a setpoint specification outside the permissibility range before the first driving function is also actually deactivated later on. In this case too, the deactivation of the first driving function takes place after the acknowledgement in time. By way of example, when the first driving function is active, the vehicle has a current speed $v_{akt} < v_{max}$ (for example, $v_{akt} = 120$ km/h), wherein the upper limit of the first driving function (for example, HAF) is $v_{max}$ (for example, $v_{set} = 130$ km/h). The driver uses a suitable input component to specify a set speed $v_{set} > v_{max}$ (for example, $v_{set} = 150$ km/h). The fact that the set speed is greater than the upper limit $v_{max}$ is preferably displayed to the driver, for example, via a specific color of an optical marker for setting the set speed. In the case of a set speed $v > v_{max}$, the driver then must acknowledge a resultant future initiation of the first driving function. If not, the set speed drops back for example, to the upper limit again.

If for example, the driving parameter is the vehicle speed and the setpoint specification for the driving parameter is a set speed, starting from a driving state with an active first driving function, the driving system may for example, establish a (dynamic) reduction in the first permissibility range, for example, because a (legally) permitted maximum speed (for example, 100 km/h) has been established on the road section that is below the previous upper limit (for example, 130 km/h) of the first permissibility range. Provided that a set speed for the first driving function is set, it is checked whether the set speed that is set (for example, $v_{set} = 120$ km/h) is outside the changed permissibility range. If this is the case, the set speed that is set is changed by the system to a speed value in the changed first permissibility range, such as the changed upper speed limit (here: 100 km/h), if the upper speed limit of the first permissibility range has changed. As an alternative, the set speed could also be changed by the system to the changed lower speed limit, if the lower speed limit of the first permissibility range has changed.

If an increase in the permissibility range is established again later, after the set speed has been changed to a speed value (for example, 100 km/h) in the changed first permissibility range, the set speed may be set to the value of the set speed (for example, 120 km/h) prior to the change in the set speed. This should take place only under the proviso that the value of the set speed (for example, 120 km/h) prior to the change in the set speed is in the increased first permissibility range.

The present subject matter also relates to a method for activating the first driving function, the technical operation of which corresponds to the above-described operation of the driving system.

The method comprises at least the following steps:
starting from a driving state with an active second driving function and a value of the driving parameter outside the first permissibility range, receiving a setpoint specification from the driver for the driving parameter that is in the first permissibility range;
when the second driving function is active, changing the value of the driving parameter in the direction of the setpoint specification by way of automated longitudinal guidance or by way of automated transverse guidance;
establishing that the driving parameter meets a first criterion with respect to the first permissibility range; and
activating the first driving function after it has been established that the driving parameter meets the first criterion.

Advantageous example embodiments of the method according to the present subject matter that are not described explicitly here and in the patent claims correspond to the advantageous example embodiments of the driving system according to the present subject matter.

The present subject matter also relates to a method for deactivating the first driving function, the technical operation of which corresponds to the above-described operation of the driving system.

The method comprises at least the following steps:
starting from a state with an active first driving function and a current driving parameter in the first permissibility range, receiving a setpoint specification from the driver for the driving parameter that is outside the first permissibility range, above the upper limit or below the lower limit;
when the first driving function is active, changing the driving parameter in the direction of the setpoint specification for the driving parameter; and
establishing that the driving parameter meets a second criterion with respect to the upper or lower limit, and
deactivating the first driving function after the driving parameter has met a second criterion with respect to the upper or lower limit, after the driving parameter has reached or exceeded the upper or lower limit.

DETAILED DESCRIPTION OF THE DRAWINGS

Figure 1:
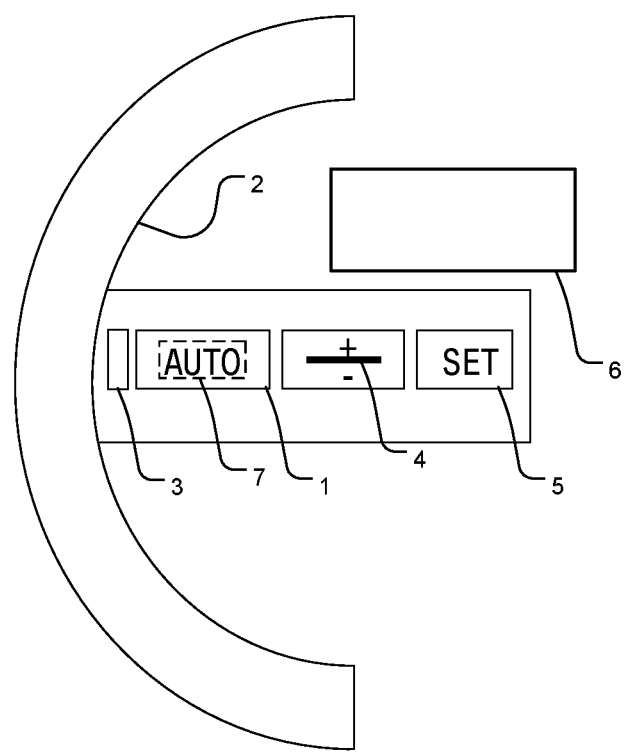
FIG. 1 shows one example embodiment of a user interface for an example driving system according to the present subject matter.

FIG. 1 schematically illustrates components of one example embodiment of a user interface for an example driving system according to the present subject matter. The driving system according to the present subject matter comprises (with decreasing degree of automation) a driving function for highly automated driving (HAF) with automated longitudinal and transverse guidance (in particular in the form of a freeway autopilot for use on a freeway), a driving function (TAF) for partly automated driving with automated longitudinal and transverse guidance and a driving function (ACC) for assisted driving with only automated longitudinal guidance in the form of adaptive cruise control. A driving function for assisted driving with only automated transverse guidance could also optionally be provided.

The user interface comprises a control element 1 ("AUTO") for signaling the desire for automated driving to the driving system. The control element 1 ("AUTO") is implemented for example, as a control button and is preferably integrated in a steering wheel 2, a section of the steering wheel rim of the steering wheel 2 being illustrated in FIG. 1. A display light 3 used as functional lighting is arranged next to the joint control element 1 ("AUTO") and lights up in principle in a first lighting color (for example, green) following actuation of the control element 1 ("AUTO"), but lights up in a second lighting color (for example, blue) following actuation of the control element 1 ("AUTO") when highly automated driving is available.

A search light 7 is preferably integrated in the control element 1 and for example, lights up the wording of the control element (here "AUTO") in a specific lighting color. The availability of the driving function HAF for highly automated driving may be communicated to the driver via the lit state of the search light 7. If the driving function HAF is available, the search light lights up for example, in the same color (here: blue) as the functional light 3, if the control element 1 has been actuated and the driving function HAF is available. Otherwise, the search light 7 for example, does not light up at all or lights up in a neutral lighting color (for example, white) in the event of low ambient light.

Also provided is a rocker 4 able to tilt in two opposing directions and that serves for example, to incrementally change a specified set speed in the case of HAF, TAF and ACC.

Also provided in the instrument panel is a tachometer display 6 that serves to display the current vehicle speed, the set speed and the speed limits of the automated driving functions HAF and TAF.

Figure 2A:
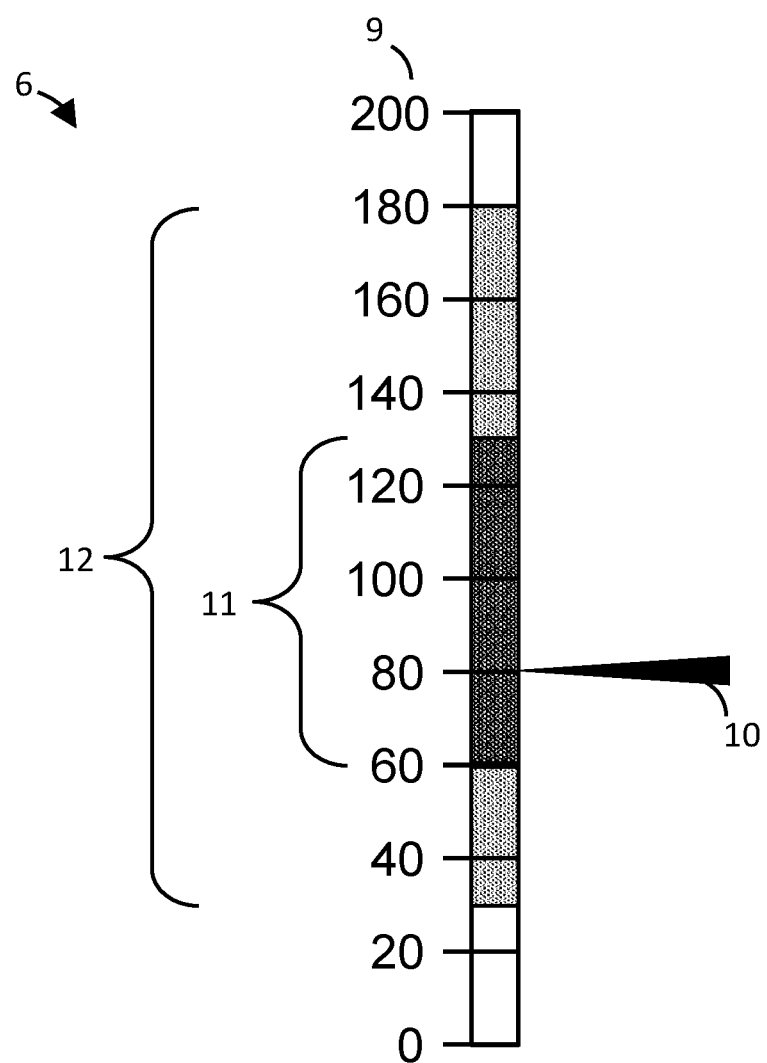
FIG. 2a-2b show example tachometer displays in the case of direct activation of the HAF driving function.

One example of a tachometer display 6 is illustrated in FIG. 2a. The tachometer display 6 comprises a tachometer scale 9 with a scale division and numerical scale numbering. Also present is a read-off marker 10 for marking the current vehicle speed $v_{akt}$. The tachometer scale marks the range 11 (here: from 60 km/h to 130 km/h) for the driving speed (the range is marked in dark in the Figure) in which the activation of the driving function HAF is possible. By way of example, this range may be marked in a color, for example, blue, associated with the driving function HAF. The upper limit $v_{HAF,max}$ (here: 130 km/h) of the range 11 results from technical reasons in the current driving situation. The upper limit $v_{HAF,max}$ is variable and is, in the presence of a legal maximum speed on the current road section, preferably reduced to this maximum speed when this falls below the speed resulting from technical reasons. The lower limit $v_{HAF,min}$ (here: 60 km/h) must not be fallen below on the freeway for legal reasons. This limit $v_{HAF,min}$ is preferably variable and depends for example, on the road class.

Also marked on the tachometer scale 9 is the speed range 12 in which the driving function TAF can be activated. The range 12 comprises the range 11 for the driving function HAF and a speed range adjoining it from above and from below (each marked brighter than the range 11 marked in dark in FIG. 2*a*), wherein the adjacent speed ranges in reality are marked in a different color (in comparison with the speed range 11) (for example, green) associated with the TAF driving function.

In the current driving situation according to FIG. 2*a*, the driver is initially driving manually without automated vehicle guidance. It is assumed that the current vehicle speed $v_{akt}$ (here: 80 km/h) is in the range 11 for the driving function HAF.

When the control element 1 is actuated, that currently available driving function that has the highest degree of automation is preferably activated.

When the driver actuates the control element 1 in order to activate the automated driving, the driving function HAF is activated directly because the current vehicle speed $v_{akt}$ was in the speed range 11 for the HAF driving function at the time when the control element 1 was actuated.

When the driving function HAF is activated, a set speed $v_{set}$ for the driving function HAF is set to the current vehicle speed (here: 80 km/h). The set speed $v_{set}$ specifies the speed to which the speed should be adjusted by the respectively active driving function in accordance with the driver's desire. The speed to which adjustment is actually performed may for example, be lower when driving behind a vehicle in front.

Figure 2B:
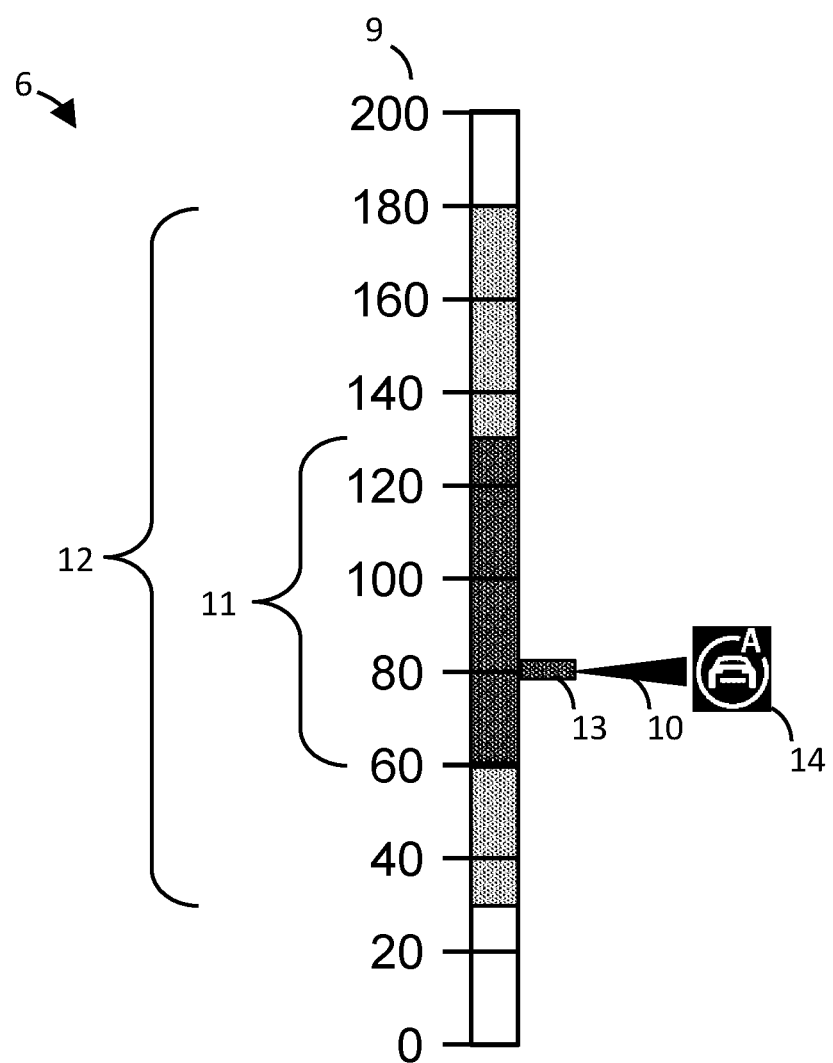

FIG. 2*b* shows a tachometer display 6 following activation of the driving function HAF. The set speed $v_{set}$ is marked by a marker 13 in the tachometer display 6. The marker preferably lights up in the color associated with the driving function HAF, for example, blue. The lighting color of the marker 13 corresponds to the color of the marked speed range 11.

The active driving function HAF is furthermore displayed by a pictogram 14 associated with the driving function HAF.

Figure 3A:
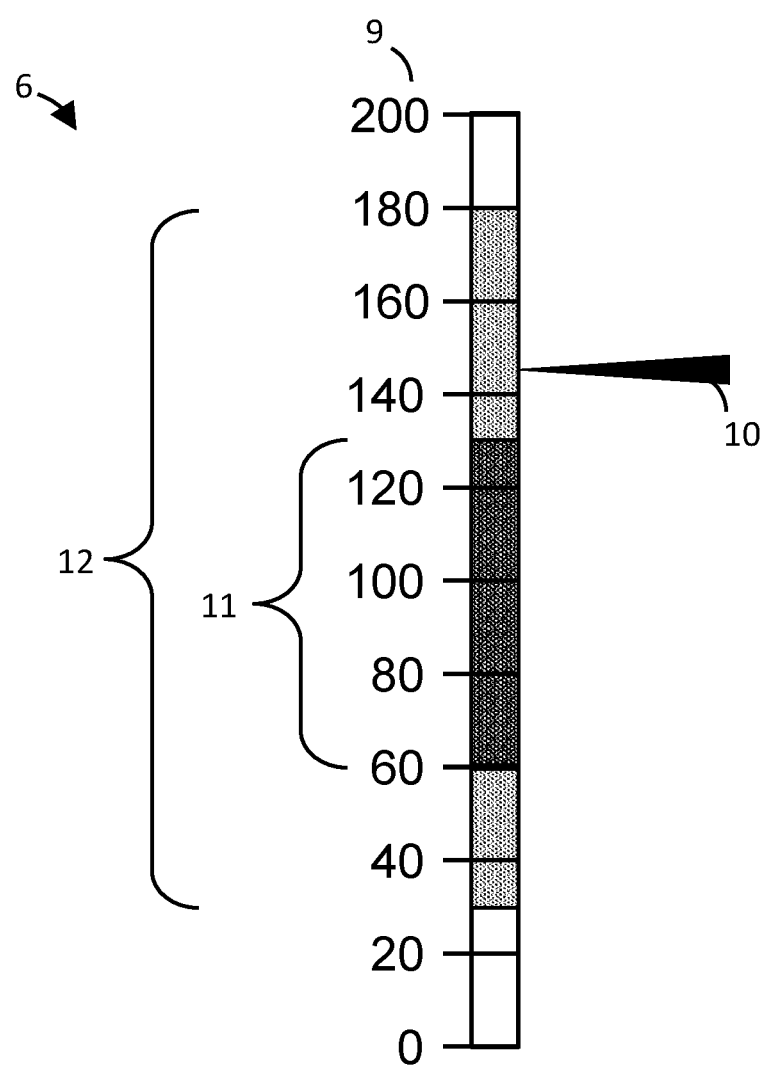
FIG. 3a-3g show example tachometer displays in the case of activation of the HAF driving function by setting the set speed.

In the situation illustrated in FIG. 3*a*, in manual driving mode, in contrast to FIG. 2*a*, the current vehicle speed $v_{akt}$ (here: 145 km/h, see read-off marker 10) is above the speed range 11. If the driver actuates the control element 1 to activate the automated driving, the driving function HAF is not activated automatically, since the current vehicle speed v is outside the range 11. The available driving function with the highest possible degree of automation is in this case the driving function TAF, since the current vehicle speed $v_{akt}$ is in the speed range 12 of the driving function TAF. The driving function TAF is accordingly activated.

Figure 3B:
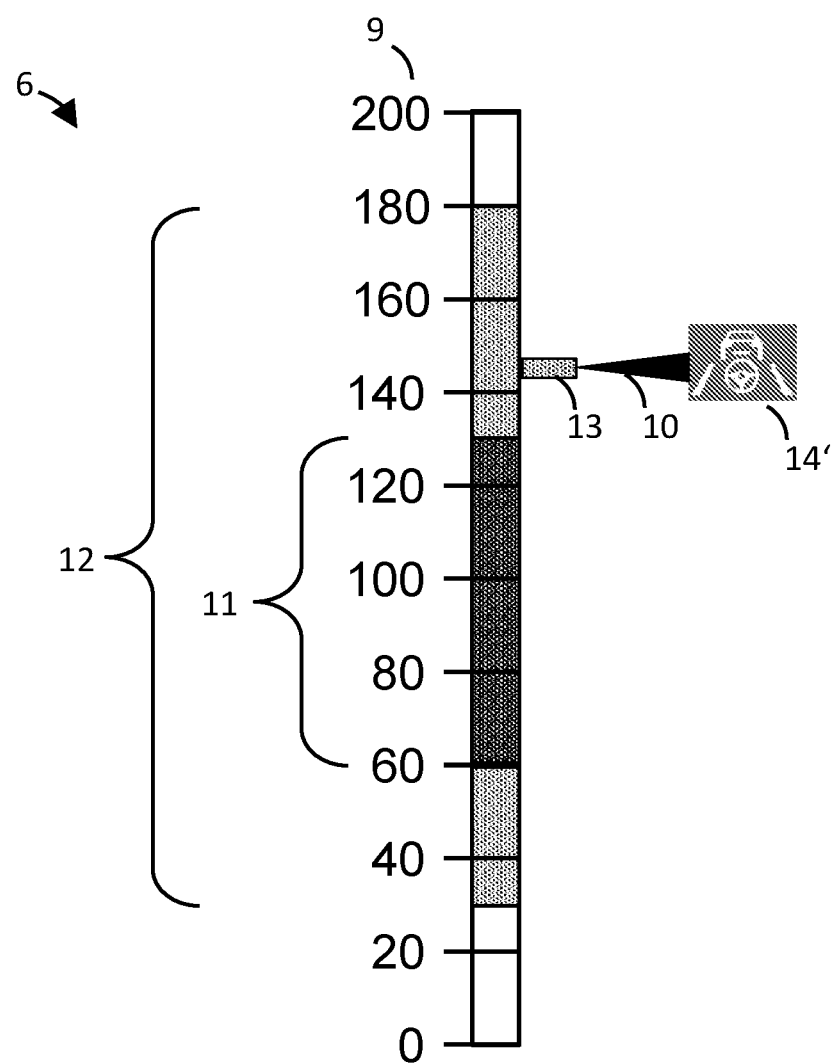

In FIG. 3*b*, the tachometer display 6 is illustrated following activation of the driving function TAF. When the driving function TAF is activated, a set speed $v_{set}$ for the driving function TAF is set to the current vehicle speed (here: 145 km/h). The set speed $v_{set}$ is marked by the marker 13 in the tachometer display. The marker 13 preferably lights up in the color associated with the driving function TAF, for example, green; this corresponds to the lighting color of the ranges, adjacent to the range 11, of the speed range 12. The active driving function TAF is furthermore displayed by a pictogram 14' associated with the driving function TAF.

If the driver wishes to activate the driving function HAF when the driving function TAF is active, and the set speed is outside the range 11 for the driving function, the driver may activate the driving function by the driver putting the set speed $v_{set}$ into the range 11.

Figure 3C:
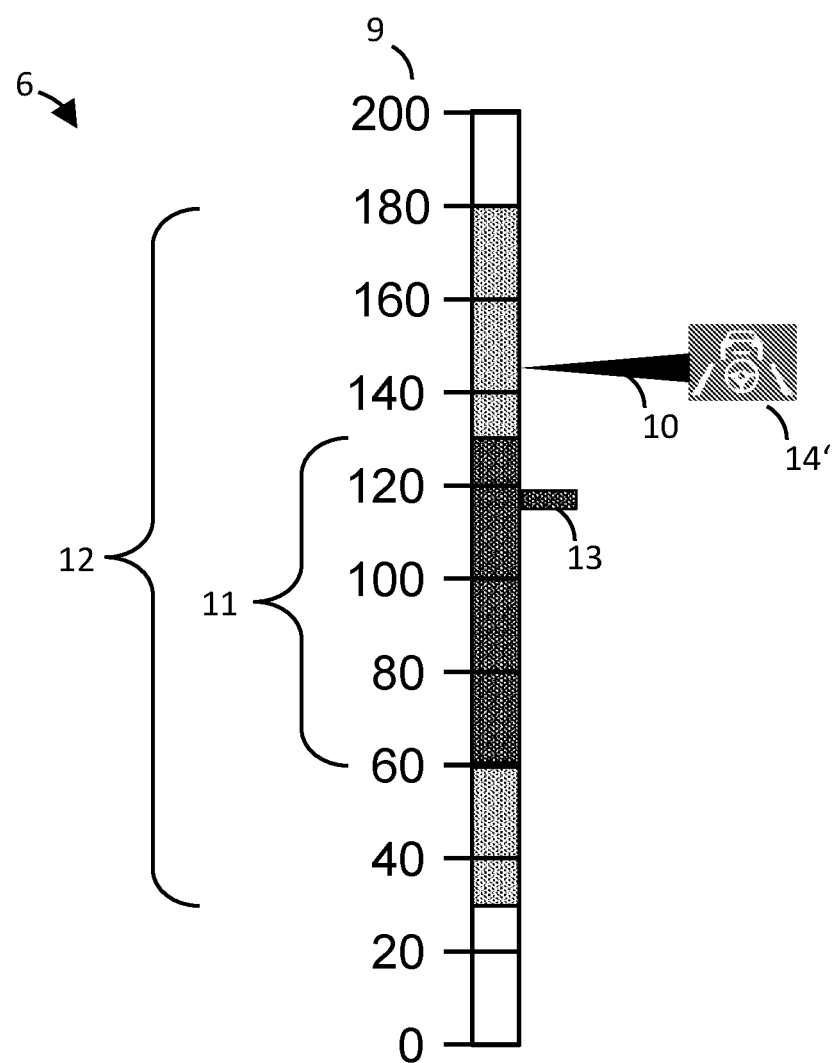

FIG. 3*c* illustrates the tachometer display 6 after the driver has shifted the set speed $v_{set}$ into the range 11.

The set speed is put into the range 11 for the driving function HAF by way of a control element (for example, by way of the rocker 4 for adjusting the speed or by way of a specific button). As soon as the set speed $v_{set}$ is in the range 11 for the driving function HAF, the marker 13 for the set speed adopts the color of the marked range 11 (here: blue). The vehicle reduces the speed until it reaches the set speed $v_{set}$.

It would also be conceivable for the set speed $v_{set}$ to be put into the range 11 for the driving function HAF by a recognized current legal maximum speed on the road section (this being recognized for example, by a traffic sign recognition system) being adopted by the driver as set speed, for example, by actuating the SET button 5.

Figure 3D:
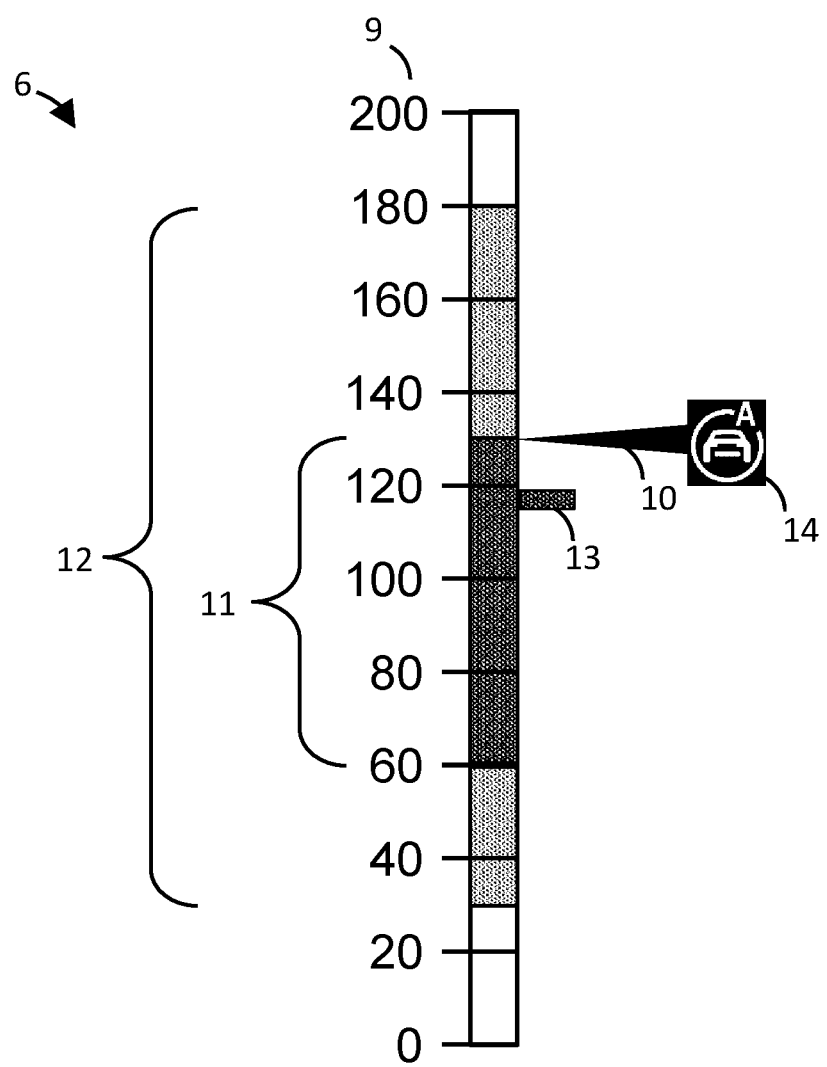

The driving function HAF is activated after the current vehicle speed $v_{akt}$ has reached the speed range 11 for the driving function. This is illustrated in FIG. 3*d*. In this case, the current vehicle speed $v_{ist}$ has reached the range 11 for the driving function HAF. The driving function HAF is activated as driving function with the currently highest possible degree of automation. In FIG. 3*d*, the vehicle speed $v_{ist}$ has not yet reached the set speed $v_{set}$. The pictogram 14 displays the fact that the driving function HAF has been activated.

After the driving function HAF is activated, the vehicle speed is automatically changed when the driving function is active until the set speed $v_{set}$ is reached.

Figure 3E:
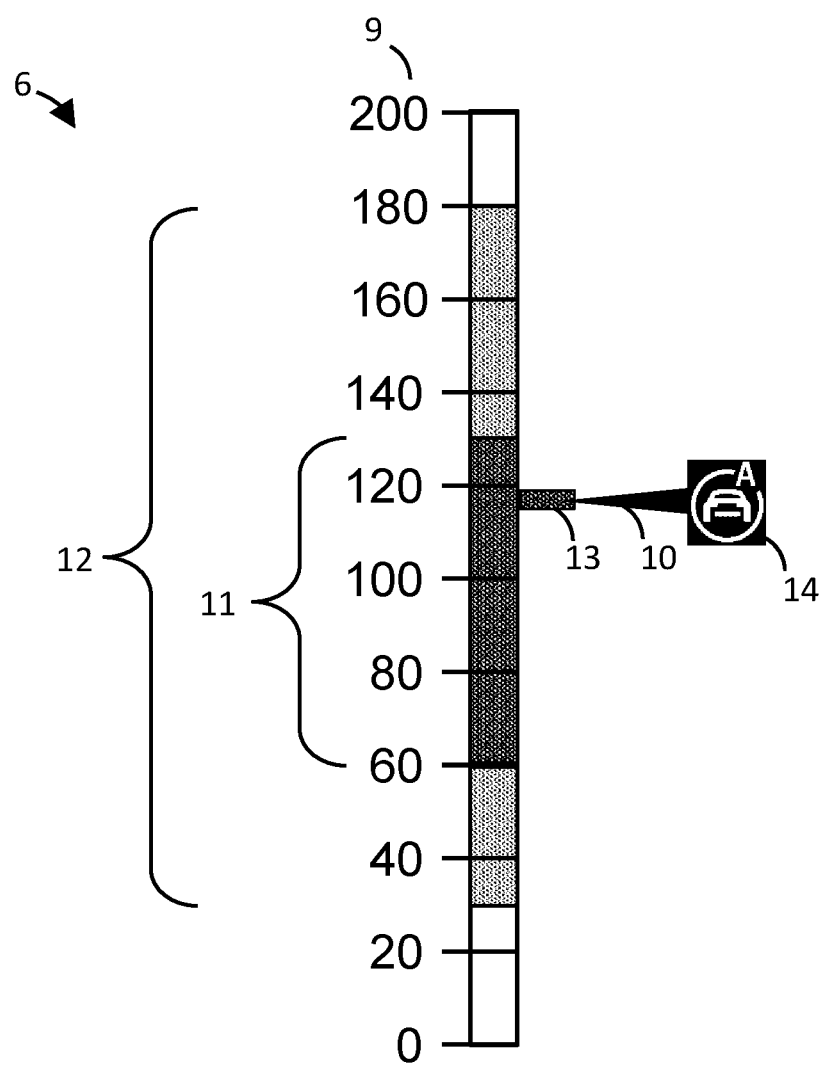

In FIG. 3*e*, the vehicle speed $v_{ist}$ has reached the set speed $v_{set}$.

The set speed $v_{set}$ may be varied within the range 11 for the HAF driving function without the HAF driving function being discarded. When the set speed $v_{set}$ changes, the driving function HAF adjusts the current vehicle speed $v_{akt}$ to the changed set speed $v_{set}$.

Figure 3F:
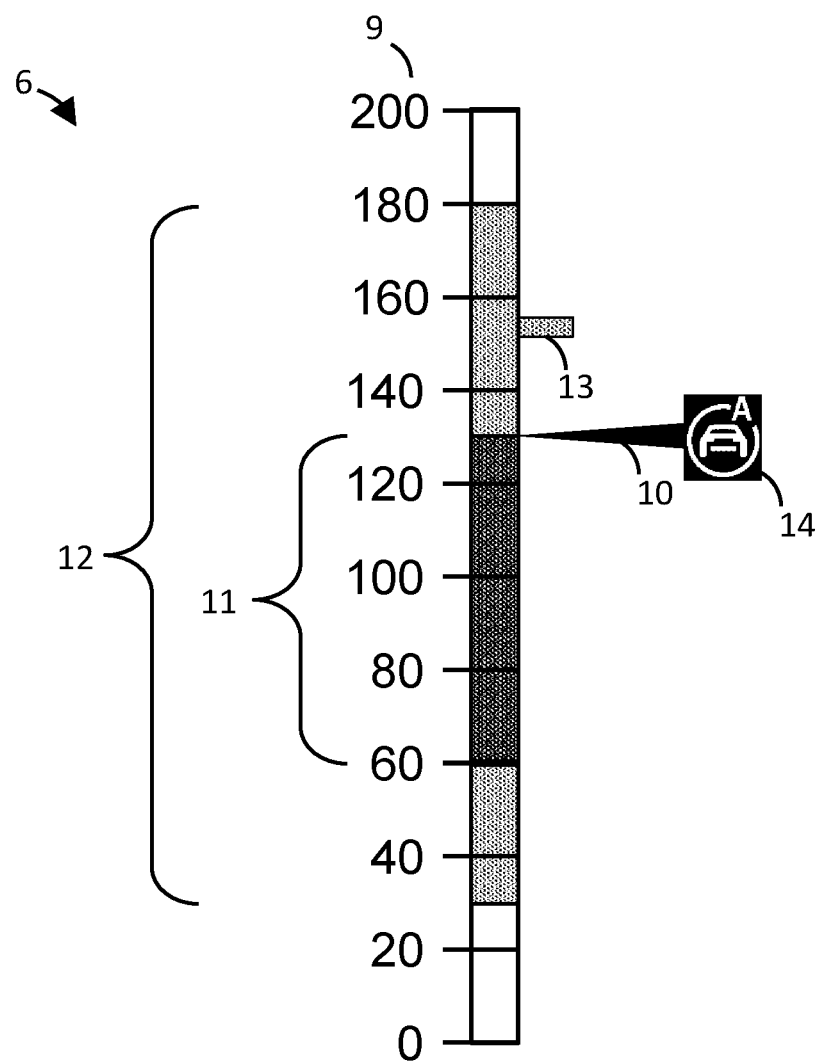

The HAF driving function may be initiated by changing the set speed $v_{set}$ when a set speed $v_{set}$ outside the range 11 is set, as is explained below with reference to FIGS. 3*f* and 3*g*.

If the driver sets a set speed greater than the upper limit of the range 11 when the HAF driving function is active, the current driving speed increases in the direction of the set speed when the HAF driving function is active. If the current speed reaches the upper limit of the range 11, the driver is asked, by way of a corresponding signal (for example, a request on a screen in the cockpit) to acknowledge the initiation of the HAF driving function (prior to the deactivation) by way of a control operation, for example, by grabbing the steering wheel 2. FIG. 3*f* illustrates this situation. The current driving speed $v_{akt}$ has reached the upper limit of the range 11; the driving system outputs a request to acknowledge the deactivation of the HAF function (not illustrated) and waits for an acknowledgement from the driver.

Figure 3G:
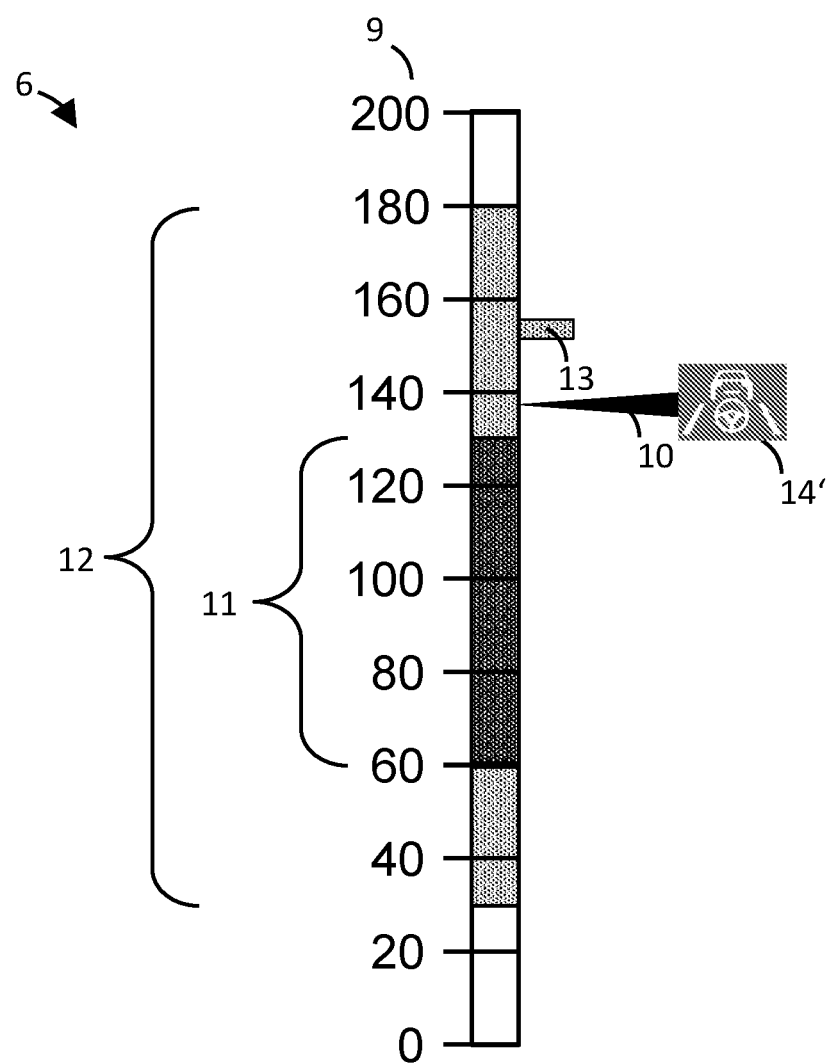

In FIG. 3*g*, the HAF driving function has already been initiated following recognition of acknowledgement from the driver and has been replaced by the driving function TAF. The current vehicle speed $v_{akt}$ is outside the range 11, the TAF driving function is activated as currently highest possible degree of automation and the set speed $v_{set}$ has not yet been reached. The current vehicle speed $v_{akt}$ then increases to the set speed $v_{set}$ when the TAF driving function is active (not illustrated).

Figure 4A:
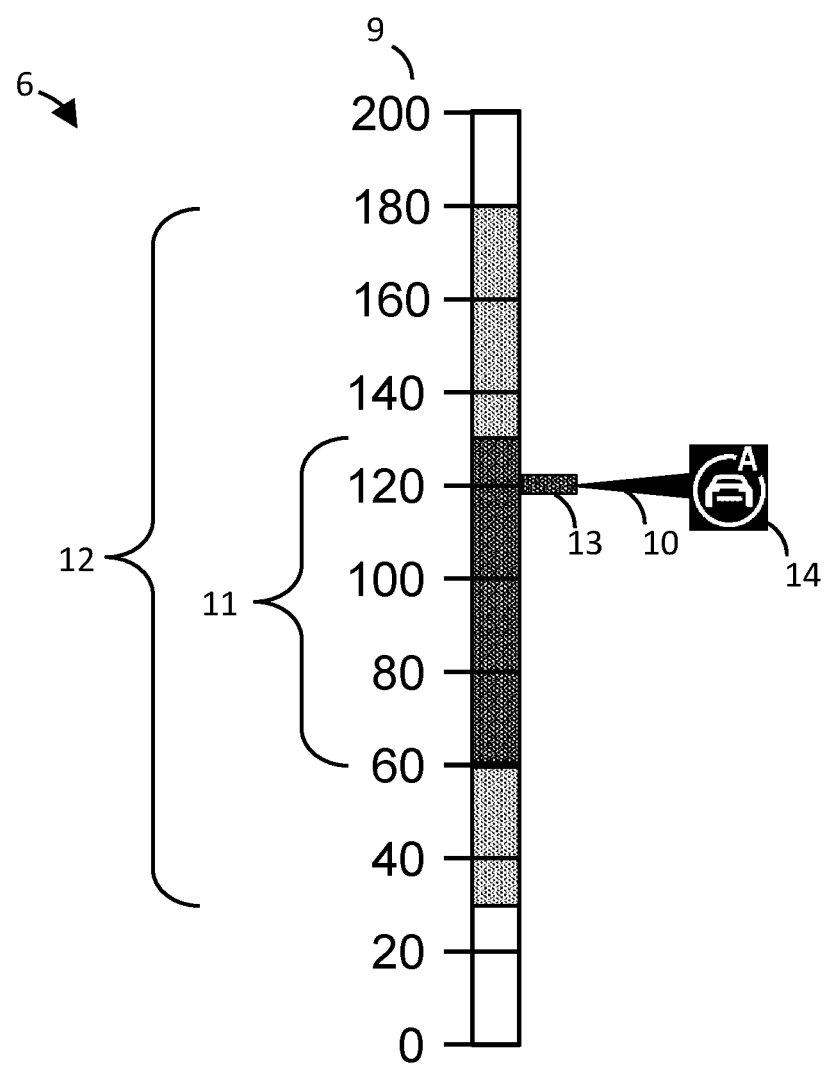
FIG. 4a-4b show example tachometer displays in the case of changing the speed range for the HAF driving function.
Figure 4B:
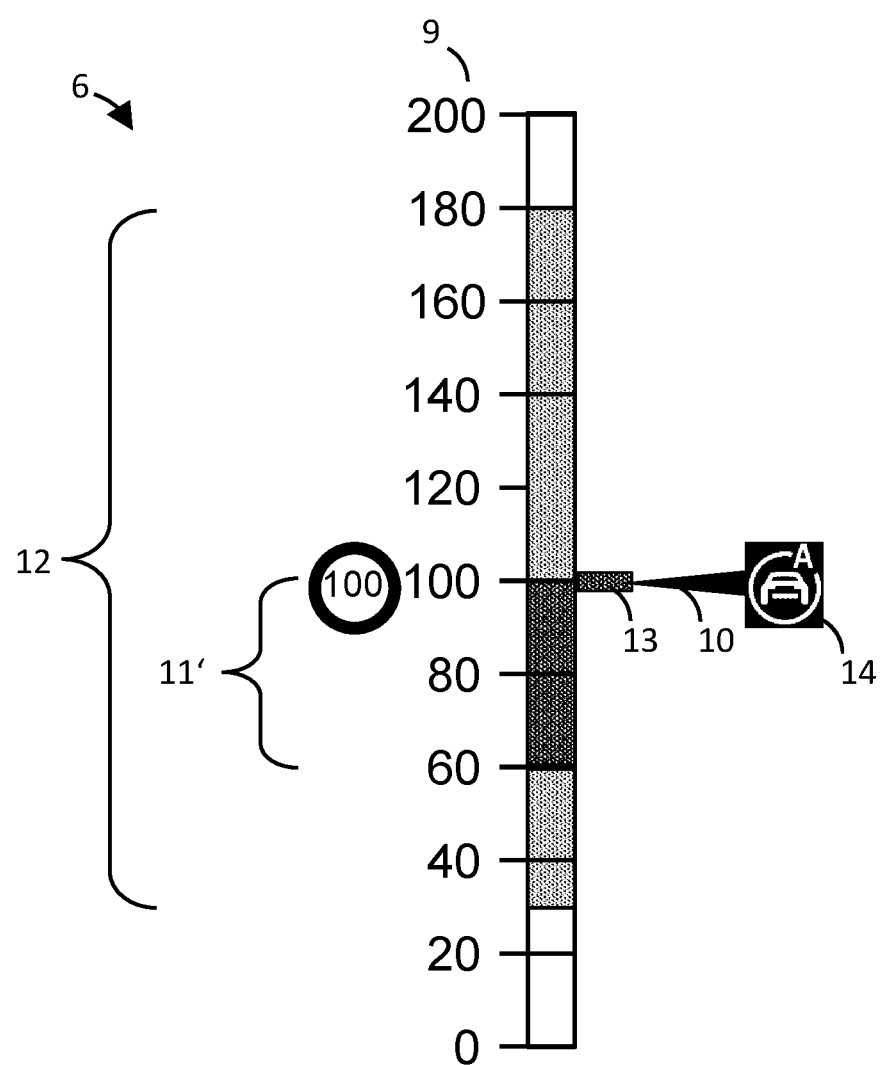

FIGS. 4a and 4b explain a change in the range 11 by way of example. In the situation of FIG. 4a, the HAF driving function is active and the set speed $v_{set}$ (here: $v_{set}$=120 km/h) is below the upper limit (here: 130 km/h) of the range 11 for the driving function HAF.

In FIG. 4b, a reduction in the previous speed range 11 for the driving function HAF has been established (here due to a legal maximum speed of for example, 100 km/h for the current road section). It has furthermore been established that the previous set speed $v_{set}$ (here: $v_{set}$=120 km/h) is below the upper limit (here: 100 km/h) of the reduced speed range 11'. In response thereto, the set speed $v_{set}$ has been "entrained"; the set speed $v_{set}$ has been changed to the changed upper speed limit.

If the range 11' for the driving function HAF then increases back to the earlier larger range 11 (because for example, the legal maximum speed of 100 km/h is increased again), the set speed is set back to the earlier value (here: 120 km/h) of the set speed prior to the change in the set speed.

The above example embodiment illustrates a relationship between the respective driving function and the speed; the driver understands that the availability of the driving function is linked to the speed. Setting the speed triggers the activation of the highest possible degree of automation.

The example embodiment described above could also be transferred to a system having a driving function with SAE Level 4 (VAF).

What is claimed is:

1. A driving system for a motor vehicle, comprising:
   an electronic control unit;
   a user interface, comprising:
     a first input component for a driver to specify a setpoint specification for a driving parameter;
   a memory in communication with the electronic control unit, the memory storing a plurality of instructions executable by the electronic control unit to cause the driving system to:
     execute a first driving function comprising automated driving with automated longitudinal and transverse guidance, wherein
       the first driving function is available in a first permissibility range for the driving parameter defined by a lower and/or upper limit;
     execute a second driving function comprising automated driving with at least automated longitudinal guidance or with at least automated transverse guidance and a lower degree of automation than the first driving function;
     start from a driving state with the second driving function active and a value of the driving parameter outside the first permissibility range;
     receive the setpoint specification for the driving parameter, which is specified by the driver via the first input component and for at least the second driving function, and that is in the first permissibility range;
     change the value of the driving parameter in the direction of the setpoint specification via the automated longitudinal guidance or via the automated transverse guidance when the second driving function is active;
     establish that the driving parameter meets a first criterion with respect to the first permissibility range; and
     activate the first driving function after the driving parameter meets the first criterion with respect to the first permissibility range.

2. The driving system according to claim 1, wherein the memory further includes instructions executable by the electronic control unit to cause the driving system to:
   activate the first driving function after the driving parameter is in the first permissibility range.

3. The driving system according to claim 1, wherein the user interface further comprises:
   a second input component for the driver to signal the driver's desire for automated driving; and
   the memory further includes instructions executable by the electronic control unit to cause the driving system to:
     start from a driving state without the first and without the second driving functions active;
     establish a desire, signaled via the second input component, for automated driving;
     check whether the driving parameter is in the first permissibility range;
     in the event that the driving parameter is in the first permissibility range, activate the first driving function;
     in the event that the driving parameter is not in the first permissibility range, activate the second driving function;
     start from a driving state with the second driving function active;
     receive a setpoint specification via the first input component for the driving parameter is in the first permissibility range;
     when the second driving function is active, change the value of the driving parameter in the direction of the setpoint specification via the automated longitudinal guidance or by via the automated transverse guidance; and
     activate the first driving function after the driving parameter meets the first criterion with respect to the first permissibility range.

4. The driving system according to claim 3, wherein the driving system supports a plurality of different driving functions for automated driving with a different degree of automation, the plurality of different driving functions comprising at least the first and the second driving functions;
   the second input component of the user interface is a joint input component for the plurality of driving functions; and
   the memory further includes instructions executable by the electronic control unit to cause the driving system to:
     activate an available driving function from the plurality of driving functions that has the highest possible degree of automation after establishing the desire signaled via the second input component for automated driving.

5. The driving system according to claim 3, wherein the driving parameter is a speed of the vehicle;
   the setpoint specification for the driving parameter is a set speed, and
   the memory further includes instructions executable by the electronic control unit to cause the driving system to:
     set the set speed to a current speed of the vehicle when activating the second driving function;

start from the driving state with the second driving function active; and
receive a set speed, changed by the driver via the first input component, that is in the first permissibility range.

6. The driving system according to claim 1, wherein
the driving parameter is a speed of the vehicle and the setpoint specification for the driving parameter is a set speed; and
the user interface further comprises:
a display component that signals to the driver that the set speed specified via the first input component is in the first permissibility range.

7. The driving system according to claim 6, wherein the display component is configured to:
mark the set speed with a marker on a speed scale, wherein
the marker is configured to be displayed in different color states; and
display the marker in a specific state of the plurality of different states when the set speed is in the first permissibility range, such that the state of the marker signals to the driver that the set speed specified via the first input component is in the first permissibility range.

8. The driving system according to claim 1, wherein
the driving parameter is the speed of the vehicle; and
the setpoint specification for the driving parameter is a set speed.

9. The driving system according to claim 1, wherein
the first driving function is a driving function for highly automated driving; and
the second driving function is a driving function for partly automated driving with the longitudinal and transverse guidance or for assisted driving with the longitudinal guidance.

10. The driving system according to claim 1, wherein
the driving parameter is the speed of the vehicle;
the setpoint specification for the driving parameter is a set speed; and
the first input component further comprises:
a control increment input for incrementally increasing and reducing the set speed; and/or
a control setting input for adopting a permitted maximum speed.

11. The driving system according to claim 1, wherein
the driving parameter is a speed of the vehicle;
the setpoint specification for the driving parameter is a set speed;
the set speed for the first driving function is specified by the driver via the first input component; and
the memory further includes instructions executable by the electronic control unit to cause the driving system to:
start from a driving state with the first driving function active;
establish a reduction in the first permissibility range;
establish that the set speed is outside the changed first permissibility range;
change the set speed to a speed value in the changed first permissibility range in response to establishing that the set speed is outside the changed first permissibility range, comprising:
changing the set speed to the changed upper speed limit if the upper speed limit of the first permissibility range has changed; or
changing the set speed to the changed lower speed limit if the lower speed limit of the first permissibility range has changed.

12. The driving system according to claim 11, wherein
the memory further includes instructions executable by the electronic control unit to cause the driving system to:
establish an increase in the first permissibility range after the set speed has been changed to a speed value in the changed first permissibility range; and
set the set speed to the value of the set speed prior to the change in the set speed in response to establishing the increase in the first permissibility range.

13. A driving system for a motor vehicle, comprising:
an electronic control unit;
a user interface, comprising:
a first input component for a driver to specify a setpoint specification for a driving parameter;
a memory in communication with the electronic control unit, the memory storing a plurality of instructions executable by the electronic control unit to cause the driving system to:
execute a first driving function for automated driving with automated longitudinal and transverse guidance, wherein
the first driving function is available in a first permissibility range for the driving parameter, defined by the lower and/or upper limit;
start from a state with the first driving function active and the driving parameter in the first permissibility range;
receive the setpoint specification for the driving parameter, which is specified by the driver via the first input component and for at least the first driving function, and that is outside the first permissibility range, above the upper limit, or below the lower limit;
change the driving parameter in the direction of the setpoint specification for the driving parameter when the first driving function is active;
establish that the driving parameter meets a second criterion with respect to the upper or lower limit; and
deactivate the first driving function after the driving parameter has reached or exceeded the upper limit or has reached or exceeded the lower limit.

14. The driving system according to claim 13, wherein
the memory further includes instructions executable by the electronic control unit to cause the driving system to:
execute a second driving function for automated driving with at least automated longitudinal guidance or with at least automated transverse guidance and a lower degree of automation than the first driving function;
activate the second driving function in the course of deactivating the first driving function; and
change the driving parameter to the setpoint specification for the driving parameter when the second driving function is active.

15. The driving system according to claim 13, wherein
the user interface further comprises:
a third input component to acknowledge the deactivation of the first driving function; and
the memory further includes instructions executable by the electronic control unit to cause the driving system to:

deactivate the first driving function only after the driving system has established that the driver has acknowledged deactivation of the first driving function via the third input component.

16. A method for activating a first driving function, comprising:
    starting from a driving state with a second driving function active and a value of a driving parameter outside a first permissibility range, wherein
        the second driving function comprises automated driving with at least automated longitudinal guidance or with at least automated transverse guidance and a lower degree of automation than the first driving function;
    receiving a setpoint specification for the driving parameter, which is specified by a driver and for at least the second driving function, and that is in the first permissibility range;
    changing the value of the driving parameter in the direction of the setpoint specification via the automated longitudinal guidance or via the automated transverse guidance when the second driving function is active;
    establishing that the driving parameter meets a first criterion with respect to the first permissibility range; and
    activating the first driving function after the driving parameter meets the first criterion, wherein
        the first driving function comprises automated driving with automated longitudinal and transverse guidance and is available in the first permissibility range for the driving parameter, defined by a lower and/or upper limit.

17. A method for deactivating a first driving function, comprising:
    starting from a state with the first driving function active and a driving parameter in a first permissibility range, wherein
        the first driving function comprises automated driving with automated longitudinal and transverse guidance and is available in the first permissibility range for the driving parameter defined by a lower and/or upper limit;
    receiving a setpoint specification for the driving parameter, which is from a driver and for at least the first driving function, and that is outside the first permissibility range, above the upper limit, or below the lower limit;
    changing the driving parameter in the direction of the setpoint specification for the driving parameter when the first driving function is active;
    establishing that the driving parameter meets a second criterion with respect to the upper or lower limit; and
    deactivating the first driving function after the driving parameter has met the second criterion by reaching or exceeding the upper or lower limit, wherein
        a second driving function comprises automated driving with at least automated longitudinal guidance or with at least automated transverse guidance and a lower degree of automation than the first driving function.

* * * * *